United States Patent [19]
Miller

[11] 4,229,193
[45] Oct. 21, 1980

[54] VACUUM CLEANER AND SEALED FILTER BAG ASSEMBLY THEREFOR PARTICULARLY USEFUL FOR FILTERING ASBESTOS FIBERS FROM AIR

[75] Inventor: Jonathan Miller, Williamsport, Pa.

[73] Assignee: Shop-Vac Corporation, Williamsport, Pa.

[21] Appl. No.: 943,637

[22] Filed: Sep. 19, 1978

Related U.S. Application Data

[63] Continuation of Ser. No. 819,002, Jul. 26, 1977, abandoned.

[51] Int. Cl.³ ............................................... B01D 50/00
[52] U.S. Cl. ............................................ 55/318; 55/341 R;
55/372; 55/377; 55/380; 55/472; 55/485;
55/502; 55/509; 55/DIG. 2
[58] Field of Search ..................... 55/318, 341 R, 363,
55/364, 366, 367, 372, 374, 376, 380, 472, 485,
429, DIG. 2, DIG. 3, 377, 502, 509

[56] References Cited

U.S. PATENT DOCUMENTS

| | | | |
|---|---|---|---|
| 2,721,624 | 10/1955 | Osborn | 55/372 |
| 2,794,513 | 6/1957 | Hultberg et al. | 55/366 |
| 2,800,194 | 7/1957 | Peek | 55/380 |
| 3,343,344 | 9/1967 | Fairaizl et al. | 55/429 X |
| 3,452,520 | 7/1969 | Fesco | 55/DIG. 2 X |
| 3,479,802 | 11/1969 | Fesco | 55/367 |
| 4,061,480 | 12/1977 | Frye et al. | 55/364 X |
| 4,072,483 | 2/1978 | Doyle, Jr. | 55/372 |

FOREIGN PATENT DOCUMENTS

| | | | |
|---|---|---|---|
| 2600338 | 7/1976 | Fed. Rep. of Germany | 55/380 |
| 801779 | 9/1958 | United Kingdom | 55/363 |
| 809899 | 3/1959 | United Kingdom | 55/380 |
| 1047804 | 11/1966 | United Kingdom | |
| 1049292 | 11/1966 | United Kingdom | |
| 1396325 | 6/1975 | United Kingdom | |
| 1396326 | 6/1975 | United Kingdom | |

*Primary Examiner*—Kathleen J. Prunner
*Attorney, Agent, or Firm*—Ostrolenk, Faber, Gerb & Soffen

[57] ABSTRACT

A vacuum cleaner filter bag assembly is provided for protecting against atmospheric contamination upon removal of the filter bag from a vacuum cleaner. The filter bag assembly includes a primary filter bag, an airtight shield, a secondary filter bag and a tertiary filter. The shield and secondary filter bag are connected so as to define a sealed enclosure within which the primary filter bag is disposed. The primary filter bag has an inlet opening but is otherwise sealed closed. An inlet opening formed in the shield is aligned with the inlet opening of the primary filter bag so that the suction hose of the vacuum cleaner directs air with entrained particulates directly into the primary filter bag. The air which passes through the primary filter bag is next passed through the secondary filter bag. The tertiary filter, which is disposed in the receptacle defined by the bag shape of the secondary filter bag, filters the air which has passed through the secondary filter bag before it is discharged to the atmosphere.

4 Claims, 7 Drawing Figures

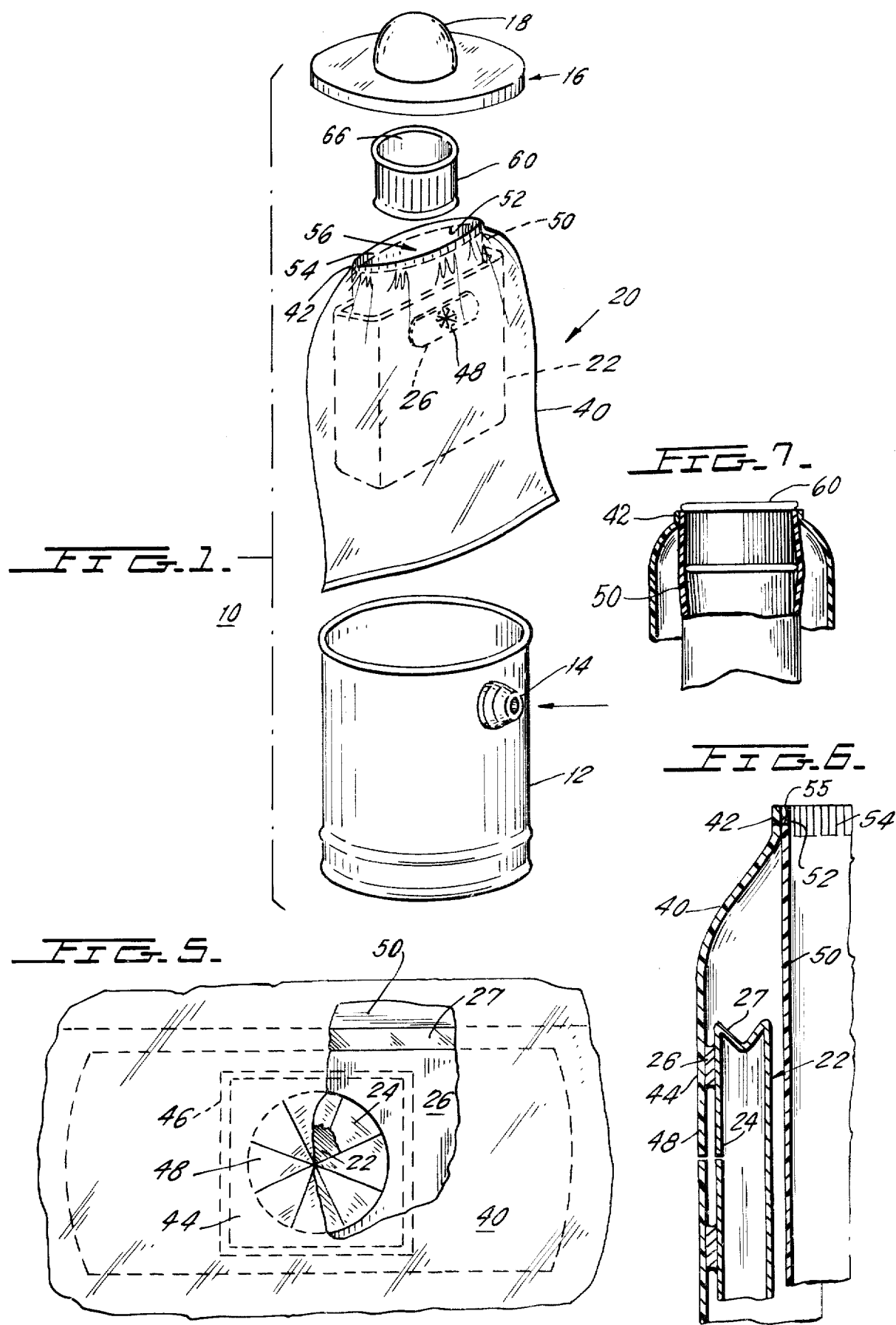

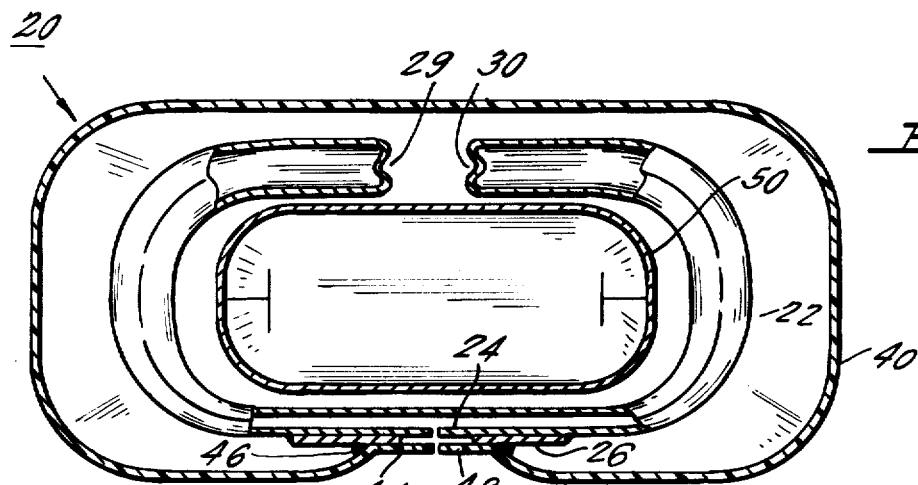
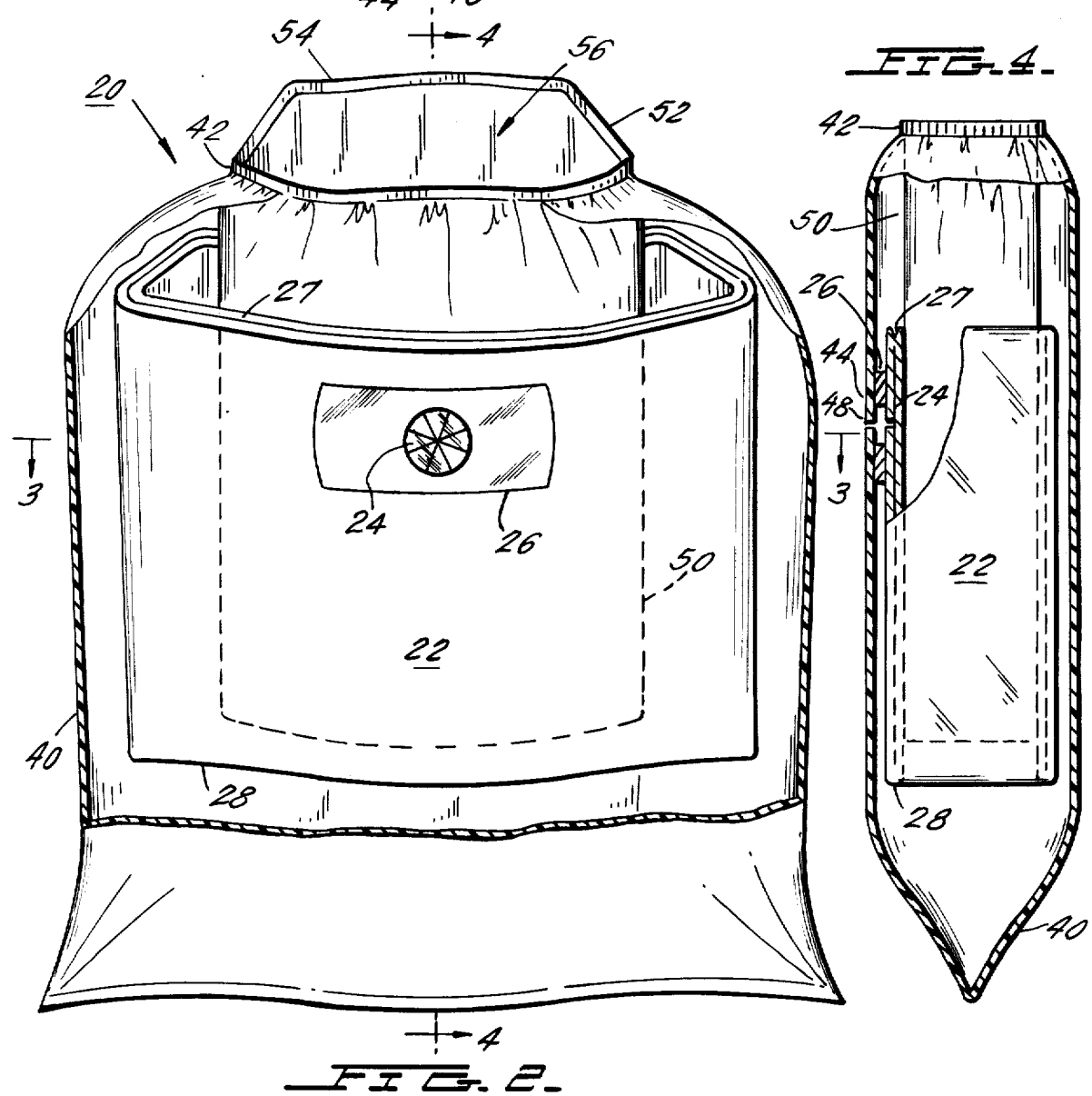
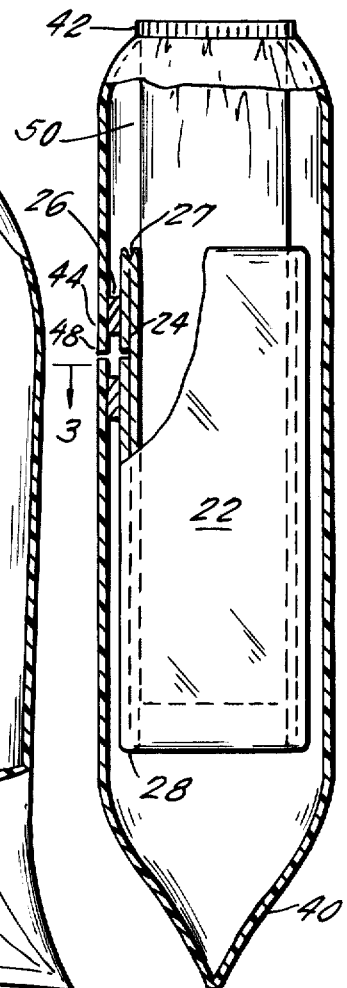

VACUUM CLEANER AND SEALED FILTER BAG ASSEMBLY THEREFOR PARTICULARLY USEFUL FOR FILTERING ASBESTOS FIBERS FROM AIR

CROSS REFERENCE TO RELATED APPLICATION

This is a continuation of application Ser. No. 819,002, filed July 26, 1977, now abandoned.

FIELD OF THE INVENTION

The present invention relates to a disposable vacuum cleaner filter bag assembly, which is capable of being discarded without recontamination of the atmosphere with the collected particulate matter.

BACKGROUND OF THE INVENTION

Known vacuum cleaner filter bags entrap particulate matter effectively. However, when the vacuum cleaner housing is opened and the bag is removed, a certain amount of the collected particulate matter is released to the atmosphere. With most particulate matter that is collected, the minimal recontamination of the atmosphere is harmless. When a vacuum cleaner is used to collect harmful particulate matter, and in particular asbestos fibers, recontamination of the atmosphere can prove quite dangerous. Various efforts have been made to contain collected particulate material in a vacuum cleaner filter bag upon opening of the vacuum cleaner and removal and disposal of the bag.

SUMMARY OF THE INVENTION

It is the primary object of the invention to provide a vacuum cleaner filter bag which is capable of being removed from the vacuum cleaner and of being disposed of without recontamination of the atmosphere with the collected particulate matter.

It is another object of the present invention to provide a vacuum cleaner filter bag which is effective in the gathering, storage and ultimate disposal of asbestos fibers and particles.

The vacuum cleaner bag assembly according to the invention includes an enclosed primary vacuum cleaner filter bag, which has a suction inlet through which the air and particulate matter to be gathered is sucked. The primary filter bag is an air permeable container, but it is impermeable to the particulate matter being collected. Suction from a vacuum source outside the primary filter bag draws air and particulate matter through the suction inlet.

The primary filter bag is surrounded on its exterior by a particulate material impermeable shield, such as a plastic bag. This shield may also be impervious to air, as well. There is interposed between the primary filter and the vacuum source a secondary filter. This filter is sealingly connected with the impermeable external shield, such that any particulate matter that escapes from the primary filter bag is trapped inside the sealed package comprised of the external shield and the secondary filter.

A tertiary filter may optionally be interposed between the secondary filter and the vacuum source. The tertiary filter is separate from or separable from the sealed package comprised of the secondary filter and the impermeable shield, whereby the tertiary filter may be disposed of separately.

The entire sealed package comprised of the primary filter bag, the impermeable shield and the secondary filter are a single unit and are disposed of as a single unit. The primary filter bag is always encapsulated within the sealed package, thereby minimizing, if not completely eliminating, any atmospheric recontamination when the filter bag assembly is removed from the vacuum cleaner and is disposed of.

The foregoing and other objects and features of the invention will become apparent from the following description taken in connection with the accompanying drawings.

BRIEF DESCRIPTION OF THE DRAWINGS

FIG. 1 is an exploded perspective view of a cannister vacuum cleaner into which a filter bag assembly according to the invention may be inserted;

FIG. 2 is a front elevational view of the principal portion of the vacuum cleaner filter bag assembly according to the invention;

FIG. 3 is a cross-sectional plan view of the vacuum cleaner bag assembly of FIG. 2 along the line and in the direction of arrows 3 in FIG. 2;

FIG. 4 is a cross-sectional side elevational view of the vacuum cleaner bag assembly of FIG. 2 along the line and in the direction of arrows 4 in FIG. 2;

FIG. 5 is an enlarged fragmentary view of the front of the assembly of FIG. 2, showing the inlet into the assembly;

FIG. 6 is an enlarged fragmentary view in cross-section, similar to that shown in FIG. 4, in which additional features of the vacuum cleaner filter bag assembly are apparent; and FIG. 7 is an assembled view of the entire filter bag assembly.

DESCRIPTION OF A PREFERRED EMBODIMENT

Referring to the drawings, particularly FIG. 1, the assembly 10 is comprised of a cylindrical cannister 12 having a suction inlet opening 14 to which a hose is connected for collecting particulate material. The cannister is covered by the cover 16, and a conventional vacuum cleaner motor 18 seats on the cover. The flow of air through the vacuum cleaner is through the inlet 14 past the filter bag assembly to be described and past the motor 18, which develops a vacuum. Hereafter motor 18 is identified as a suction or vacuum source.

The vacuum cleaner 10 further comprises the filter bag assembly 20 between the inlet 14 and the vacuum source. The assembly 20 is comprised of the primary filter bag 22, which is shown in the collapsed, unused condition. The primary filter bag 22 is comprised of a conventional air permeable, but particulate material and particularly asbestos fiber impermeable, paper material. The bag 22 is flexible and is folded so as to be expansible, whereby as particulate material is drawn into the bag 22, the bag balloons out and fills a considerable part of the volume of the cannister 12. The primary filter bag 22 has a conventional inlet opening 24 leading into it, which is sealed off by the conventional cut paper flaps of a standard vacuum cleaner filter bag. The rigidifying cardboard frame 26 surrounding the inlet 24 enables the primary filter bag to be emplaced at the cannister nozzle 14 in the usual manner. The primary filter bag extends from its opening 24 to its top and bottom margins 27 and 28 and to its free end portions 29 and 30. It is significant that the entirety of bag 22 is contained within the below described external impervious shield 40.

Surrounding the primary filter bag 22 on the outside is a shield 40. The shield 40 is preferably air impervious. More important, however, the shield 40 must be impermeable to the particulate material being collected in the primary filter bag 22, e.g. asbestos particles. The illustrated shield 40 is comprised of a plastic bag which is completely sealed closed around all its margins, except its neck 42, as described further below. The plastic bag 40 is tangent at its interior to the primary filter bag 22 in the vicinity of the inlet opening 24 into the primary filter bag 22. The interior surface of the bag 40 at the section 44 thereof is affixed to the cardboard frame 26. A cement or glue layer 46 surrounds the entrance opening 24 into the primary filter bag and precludes leakage of particulate material from the inlet opening past the cement layer 46 and into the plastic bag 40. The area 44 of the plastic bag, which surrounds the opening 24 into the primary filter bag, has a flap opening 48 therethrough which is aligned with and is the same size as the opening 24, so that the hose connection through the cannister inlet 14 may communicate through plastic bag 40 and through the inlet 24 of the primary filter bag into the interior of the filter bag 22.

The filter bag assembly 20 further comprises the secondary filter 50, which is interposed in the air flow pathway between the primary filter bag 22 and the suction or vacuum source 18. Air that enters through the cannister inlet 14 and that permeates through the primary filter bag 22 next passes through the secondary filter 50 on its way toward the vacuum source. The secondary filter 50, like the primary filter bag 22, is comprised of air permeable, flexible, paper material, which is, at the same time, impermeable to the particulate material, such as asbestos, being collected by the primary filter bag 22. The secondary filter 50 is illustrated as being in the form of an open topped bag that extends downwardly into the shield bag 40. The bag secondary filter 50 is completely enclosed except for its upper open neck 52. Although the secondary filter 50 could be of any shape, including a flat sheet extending across the open neck 42 of the plastic bag shield 40, the secondary filter 50 is in the form of a bag in part to enable reception of the below described tertiary filter.

The upper neck 52 of the secondary filter 50 and the open upper neck 42 of the external shielding bag 40 are attached together in a manner, which at least minimizes, if it does not completely prevent, the escape past the joined necks of either air or particulate matter. The necks 42 and 52 might be integrated, they might be heat sealed together, or they might be sewn together in an air tight manner.

In the preferred version, the necks 42 and 52 are sewn together as schematically shown at 55 along with a strip 54 of elastic cloth (see FIG. 6), which elastically squeezes the opening 56 closed around the below described tertiary filter 60 (see FIG. 7). The now integral assembly 20 comprised of primary filter bag 22, the shield 40 and the secondary filter 50 trap any of the particulate material that may have permeated through the primary filter which is sealed inside the sealed package comprised of the external shield 40 and the secondary filter 50. This combined assembly 20 acts as a shield against recontamination of the environment by particulate material, such as asbestos fibers, when the assembly 20 is removed from the cannister 12.

The tertiary filter 60 is simply placed in the receptacle defined by the bag shape of the secondary filter 50, and the elastic strip 54 at the neck 52 of the secondary filter squeezes around the tertiary filter providing an adequate seal therewith. The tertiary filter is interposed between the secondary filter 50 and the suction or vacuum source 18. The tertiary filter acts as a third filtering system to give additional safety in terms of preventing contamination of the atmosphere during operation of the vacuum cleaner. The likelihood of asbestos fibers or other particulate material ever reaching the tertiary filter is rather small, whereby the tertiary filter need not be included as part of the sealed assembly 20.

It is contemplated, for example, that the tertiary filter 60 would be a conventional automotive type cartridge filter, used in the air intake manifold of the carburetor of a conventional automotive vehicle. For example, such a filter is comprised of an accordion pleated sheet of paper arranged in a cylinder, with the incoming air passing from the exterior of the cylinder of paper into the open center 66 of this filter. Although the use of the tertiary filter is optional, with asbestos filtration systems, it is the final safety filter and its use is recommended.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A filter bag assembly for a vacuum cleaner, comprising:
    a primary filter bag for collecting particulate material; a first inlet into said primary filter bag; said primary filter bag being otherwise sealed closed; said primary filter bag being permeable to air, but impermeable to particulate material to be collected in said primary filter bag;
    a shield around said primary filter bag; said shield being impermeable to both particulate material and to air; said shield having an open neck;
    a secondary filter shaped in the form of a bag having an open neck with said secondary filter bag having an outside serving as its inlet side and having an inside which is its outlet side; said secondary filter being sealingly attached at said open neck of said secondary filter to said shield at said open neck of said shield to seal closed said shield open neck, thereby to define an enclosure comprised of said shield and said secondary filter bag around said primary filter bag and in which said primary filter bag is wholly enclosed; said secondary filter being permeable to air but impermeable to the particulate material; a second inlet through said enclosure opening into said enclosure and also communicating with said first inlet;
    a tertiary filter positioned outside said enclosure at said shield open neck, being placed inside said secondary filter bag, and being in communication with said secondary filter for receiving outflow from said secondary filter; said tertiary filter is positioned at and is surrounded by said attached shield open neck and secondary filter open neck; at said shield open neck, at the attachment there with said secondary filter, elastic means being provided for drawing said shield open neck closed and also for closing said open neck of said secondary filter bag around said tertiary filter to provide a seal therewith.

2. The filter bag assembly of claim 1, wherein said shield comprises a plastic bag.

3. A vacuum cleaner comprising:
 a container, a container inlet into said container, and a vacuum source spaced from said container inlet;
 said filter bag assembly of claim 1 being located in said vacuum cleaner container with said first and said second inlets communicating with said container inlet and with said tertiary filter communicating with said vacuum source.

4. A filter bag assembly for a vacuum cleaner, comprising:
 a primary filter bag for collecting particulate material; a first inlet into said primary filter bag; said primary filter bag being otherwise sealed closed, said primary filter bag being permeable to air, but impermeable to particulate material to be collected in said primary filter bag;
 a shield around said primary filter bag; said shield being impermeable to both particulate material and to air; said shield having an open neck;
 a secondary filter being sealingly attached to said shield to seal closed said shield open neck so as to define an enclosure comprised of said shield and said secondary filter around said primary filter bag and in which said primary filter bag is wholly enclosed; said secondary filter being permeable to air but impermeable to the particulate material; a second inlet through said enclosure opening into said enclosure and also communicating with said first inlet; said secondary filter having an outlet side;
 a tertiary filter positionable outside said enclosure; said tertiary filter having an inlet side and an outlet side; said tertiary filter being positionable inside said shield open neck and said neck being closed around said tertiary filter, such that the inlet of air and particulate material to said tertiary filter is from said secondary filter and said outlet side of said secondary filter communicates to said inlet side of said tertiary filter; said tertiary filter is positioned at and is surrounded by said attached shield open neck and said secondary filter; at said shield open neck, and the attachment there with said secondary filter, elastic means being provided for drawing said shield open neck closed and thereby squeezing against said tertiary filter.

* * * * *